United States Patent
Duke (10) Patent No.: US 6,407,749 B1
(45) Date of Patent: Jun. 18, 2002

(54) COMBINED SCROLL AND ZOOM METHOD AND APPARATUS

(76) Inventor: John H. Duke, 11 Elton St., Providence, RI (US) 02906

(*) Notice: Subject to any disclaimer, the term of this patent is extended or adjusted under 35 U.S.C. 154(b) by 160 days.

(21) Appl. No.: 09/631,331

(22) Filed: Aug. 3, 2000

Related U.S. Application Data (60) Provisional application No. 60/147,168, filed on Aug. 4, 1999.

(51) Int. Cl.[7] .................................................. G09G 5/34
(52) U.S. Cl. ..................... 345/684; 345/687; 345/660
(58) Field of Search ................................ 345/660, 661, 345/672, 684, 687

(56) References Cited

U.S. PATENT DOCUMENTS 5,615,384 A * 3/1997 Allard et al. ................ 345/660
5,867,158 A * 2/1999 Murasaki et al. ........... 345/684

* cited by examiner

*Primary Examiner*—Matthew Luu (57) ABSTRACT

Method and apparatus for simultaneously scrolling and zooming graphic data in a display device in response to pointing device action by user. The system alternates between zooming in and zooming out at preset rates in response to successive user actuations of a unique button set on the pointing device. While the button set remains actuated the pointing device acts to pan the viewport.

1 Claim, 6 Drawing Sheets

COMBINED SCROLL AND ZOOM METHOD AND APPARATUS

This appl. claim benefit of Prov. No. 60/147,168 filed Aug. 4, 1999.

BACKGROUND OF THE INVENTION

1. Field of the Invention

This invention relates to an improved method of manipulating the scale and field of view of data in computer graphic displays.

2. Description of the Prior Art

Scrolling and zooming are among the most frequently used commands in computer graphics applications such as computer aided design, drawing, graphic design, drafting, digital map reading, and navigation of graphical internet sites. This is because the full extent of the graphic data or "virtual screen" is typically much larger than can be displayed by the computer's display device in an application window or "viewport" at an appropriate working scale. The user typically must zoom in and scroll to a location in the virtual screen to input, edit, or view graphic data, zoom out to view its larger context, and then zoom back in again to continue, often to a different location in the virtual screen. Working in such applications users generally follow a repeating iterative pattern of zooming in and then zooming out, with associated scroll operations.

In the early prior art scroll and zoom commands were executed in many ways, for example by a keyboard action or by pointing with a mouse and clicking on a designated button, slider, pull down menu, or pop-up dialog box. The most significant limitation of early scroll operations was that they were limited to horizontal or vertical directions, so that diagonal movements required multiple steps. The most significant limitation of early zoom commands was that they only zoomed in or out on the center of the current viewport. Therefore to view an off-center location in large scale the user had to also execute a separate scroll command. Here the user had to choose whether to zoom before scrolling or vice-versa. If the user zoomed first the new area of interest would often then be far away (in large scale) and also off the screen, so the user would have to search for it while scrolling, which was inefficient. Conversely, if the user scrolled before zooming, he/she would have to estimate when the new area of interest was in the center of the viewport, which was not accurate in small scale. As a result of these scale effect problems, in practice users often had to scroll first to a general area, zoom in, and then scroll again to fine tune their location.

Several later improvements described ways to make the scrolling process more efficient. Cooper (U.S. Pat. No. 5,22,785), Watanabe & Tanaka (U.S. Pat. No. 5,583,538), and Murasaki & Kihara (U.S. Pat. No. 5,867,158) describe direct scrolling or panning to a new location designated by the "pointer" or cursor. These methods, however, had to be repeated in order to scroll to a location outside the original viewport. Other improvements in scrolling methods involved pointer movement in predetermined regions or with respect to a viewport or a scroll frame boundary, including Schnarell & Wirfs-Brock (U.S. Pat. No. 4,720,703), Kurakake (U.S. Pat. No. 4,734,689), Yanker (U.S. Pat. No. 5,075,673 & 5,187,776), Maejima (U.S. Pat. No. 5,696,530), Gest & Wymore (U.S. Pat. No. 5,333,247), Belifore et. al. (U.S. Pat. No. 5,7266,687), Haynes (U.S. Pat. No. 5,864,330), and Berstice & Modh (U.S. Pat. No. 5,874,936). The above improvements over the traditional scroll bar methods do not disclose a combined zoom capability.

Improvements in zoom methods include Gasperina (U.S. Pat. No. 5,491,781) and Perry (U.S. Pat. No. 5,553,225) who describe incorporating graphical zoom tools in otherwise traditional scroll bar designs. These methods function to either scroll or zoom as separate commands but do not scroll and zoom simultaneously. While scrolling these methods also remain constrained to orthogonal movements.

Another improvement in zoom methods which combines the result of a scroll function is the "zoom to area" command available both in the computer aided design software published by the SolidWorks Corporation of Concord, Mass. and in the Expedia™ digital atlas published by Microsoft Corporation of Redmond, Wash. In this method the user creates a rectangle with a point and drag operation around an area to which he/she wishes to zoom to. If this area is not in the viewport center the zoom to area has the same result as combining a traditional center viewport zoom with a scroll operation to that area. However scrolling to a location out of the original viewport is not achieved. To do this the user would have to first zoom out to widen the original display area and then execute the zoom to area command. Or the user could scroll before or after in traditional fashion. Using the zoom to area command remains a multi-step process. Related prior art includes Yeomans (U.S. Pat. No. 4,800,379) and Allard et. al. (U.S. Pat. No. 5,615,384). Satta et. al. (U.S. Pat. No. 5,073,771) disclose a variation on the zoom to area method wherein three frames are superimposed on the viewport. A first and second frame are proportional to the relative size and position of the virtual screen and viewport respectively. A third frame represents a zoom to area in the scale of the first and second. This method does provide for a zoom to area outside the original viewport. However the three frames are a visual distraction from user data and the mental process of interpreting their meaning relative to the current viewport scale is an interruption.

Objects and Advantages

The principle object of the present invention is to provide an efficient means to navigate a virtual screen area in a subliminal way which does not divert a user's visual attention from his or her subject. In the prior art a common attribute of mouse controlled zoom and scroll commands is that they require the user's visual attention in maneuvering the display pointer. Moreover, the execution of zoom and scroll commands, although intuitive, generally requires a conscious cause and effect thought process. Together these brief but frequent visual and mental interruptions add up to a significant distraction from the job at hand, thus lowering user productivity. As will be disclosed below, in the present invention the display pointer disables immediately and no graphic tools come into view, so the user need attend only to his or her own data. The invention smoothly combines both scrolling and zooming in a continuous motion, automatically zooming in or out according to typical user work patterns. Scrolling in a "panning camera mode" is through non-location specific directional mouse movements not requiring a conscious thought process.

Navigation in a virtual screen area often requires both zooming and scrolling to reach a location. A particular object of this invention is to combine both scrolling and zooming in a single operation, and to do so in a way that is efficiently able to scroll to the entire virtual screen area. This saves time and lessens distraction from the job at hand by reducing the number of commands the user must execute.

A typical user work pattern in graphics applications is to alternate zooming in and out to and from different areas of detail. A farther particular object is therefore to provide a unified command which automatically switches itself back and forth from zooming in to zooming out, thereby anticipating user needs.

An unexpected result of the scroll/zoom in combination is that the scroll functions as a variable resolution scroll relative to the virtual screen. As noted above, scale problems arose in the prior art when users had to either scroll before zooming in or after zooming in. The present invention solves these scale problems. At the beginning of a scroll/zoom in operation the display is in small scale and scrolling quickly covers large areas of the virtual screen. As the user scrolls nearer his or her destination the scale is continuously increasing by virtue of the simultaneous zooming in. Relative to the virtual screen the mouse to pointer link thereby shifts into a higher resolution allowing the user to efficiently home in on his or her destination without requiring precise mouse control.

Another unexpected result stems from the scroll/zoom out combination. As is known, when zoomed in on an area of detail in a virtual screen and when needing to scroll to another distant area of detail, it is generally best to zoom out first. This helps the user locate the new area visually and also speeds up the scroll by reducing scale. As will be disclosed, in the current invention the user can begin to scroll in the general direction of the new area of detail while zooming out. The new area then comes into view sooner than it would have by zooming straight out from center, so the user therefore need not zoom out as far. Also he or she will then not have to zoom back in as far. This saves time. In addition the work experience is visually smoother and therefore less fatiguing with fewer extreme and abrupt changes in scale.

A further object of the present invention is to provide a means to efficiently scroll in non-orthogonal directions in the virtual screen in a way which can reach the entire virtual screen area in a single operation. This will save the user additional time.

Another object is to allow the elimination scroll bars, dedicated zoom buttons, and other related tools from the graphical user interface. This can save screen space more productively occupied by user data.

SUMMARY OF THE INVENTION

These and other objects are achieved in the following way. The invention comprises a data processing system which supports a means for display of graphic user data in the viewport of a display device and a pointing device such as a mouse. Simultaneous scroll and zoom functionality acts during detection of a user input such as simultaneous depression of two particular buttons on the mouse. During scroll/zoom functionality the mouse disconnects from the display pointer and attaches to the viewport origin so that the mouse then acts to move the viewport with respect to the virtual screen containing the entire graphic user data. In this way the user may scroll across the virtual screen as though panning a camera over a stationary subject. The data processing system further contains a software zoom toggle which directs the viewport to alternately zoom in at a predetermined rate upon detection of a first such user input, and then zoom out at a predetermined rate upon detection of a next such user input, thus anticipating typical user work patterns. Long range scrolling is efficiently performed by zooming out while beginning to scroll in a desired general direction and then switching to zoom in while continuing to scroll, thus easily homing in on the desired destination. The invention provides a means to navigate a virtual screen area in a subliminal way not requiring use of on screen graphical tools.

BRIEF DESCRIPTION OF THE DRAWINGS

A particular embodiment of the invention is described in the following with reference to the accompanying drawings in which.

DETAILED DESCRIPTION OF THE INVENTION

Figure 1:
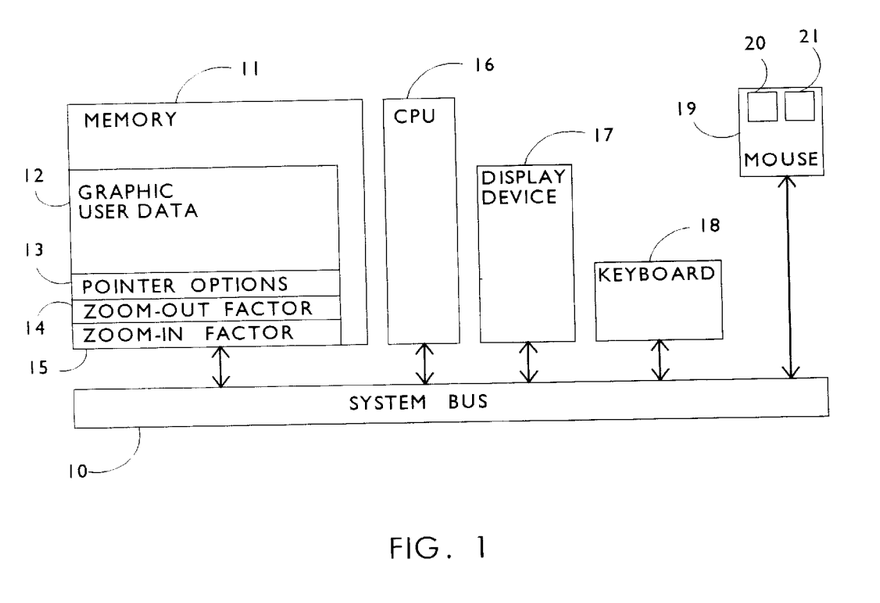
FIG. 1 is a high level block diagram of the data processing system utilized to implement the method and apparatus of the present invention.

In FIG. 1., a system bus 10 connects the components of the data processing system, including a memory 11 comprised of both random access memory and disk portions which provides means to store a graphic user data 12, a set of user definable pointer options 13, a user definable zoom-out factor 14, and a user definable zoom-in factor 15. Also connected to system bus 10 is a central processing unit 16 (CPU) which processes the logic of the present invention. Further connected to system bus 10 is a display device 17 providing means, in the known manner, to display all or a portion of graphic user data 12. Also connected to system bus 10 are a keyboard 18 and a mouse 19. Integral to mouse 19 are a left button 20 and a right button 21.

Figure 2A:
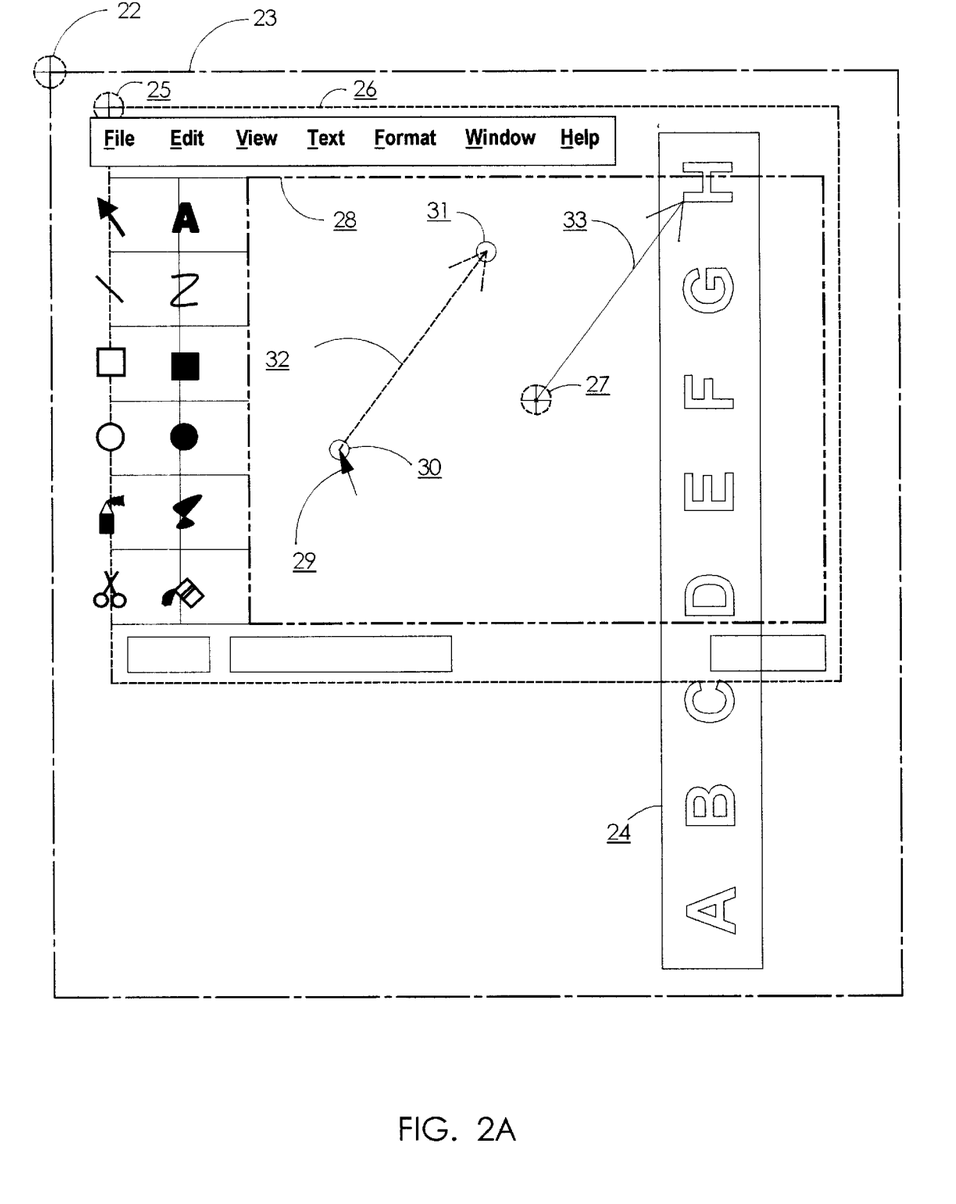
FIGS. 2A & 2B show a graphical user interface with sample user data which demonstrates the function of the present invention at two stages.

FIG. 2A illustrates an example of a first functional stage appearing on display device 17. This imagery includes a device origin 25 in the top left corner of a device window 26 within which is a viewport 28. A viewport origin 27 is in the center of viewport 28. Viewport 28 can display either a portion of a virtual screen 23 or the entire virtual screen 23, depending on user input. Virtual screen 23 is the physical display of graphic user data 12 stored electronically in memory 11. A virtual screen origin 22 is in the top left corner of virtual screen 23. X coordinates of virtual screen 23 increase rightward from zero at virtual screen origin 22; Y coordinates of virtual screen 23 increase downward from zero at virtual screen origin 22. Appearing partially within viewport 28 is an example user data element 24 and a pointer icon 29. A beginning pointer location 30 recorded in virtual screen coordinates is coincident with pointer icon 29. A ghost pointer location 31 also recorded in viral screen coordinates is a point to which mouse 19 would have directed pointer icon 29 in the current viewport scale if pointer icon 29 had not been disconnected from mouse 19, as described below. The distance shown between points 30 and 31 is here exaggerated for demonstration purposes. A vector 32 beginning at point 30 and ending at point 31 is a free vector recorded in virtual screen coordinate units. Pointer options 13 such as speed and acceleration govern the control of ghost pointer location 31 by mouse 19 so that the relation between mouse 19 displacement and the viewport coordinate unit length of vector 32 remain constant regardless of viewport scale. However, as noted the system records the length of vector 32 in virtual screen coordinate units rather than viewport coordinate units. Pointer options 13 may be modified by the user in the known manner. A directional arrow 33 represents a desired scroll path of viewport origin 27 which is equal in length in virtual screen coordinate units to vector 32 and also parallel to vector 32.

Figure 2B:
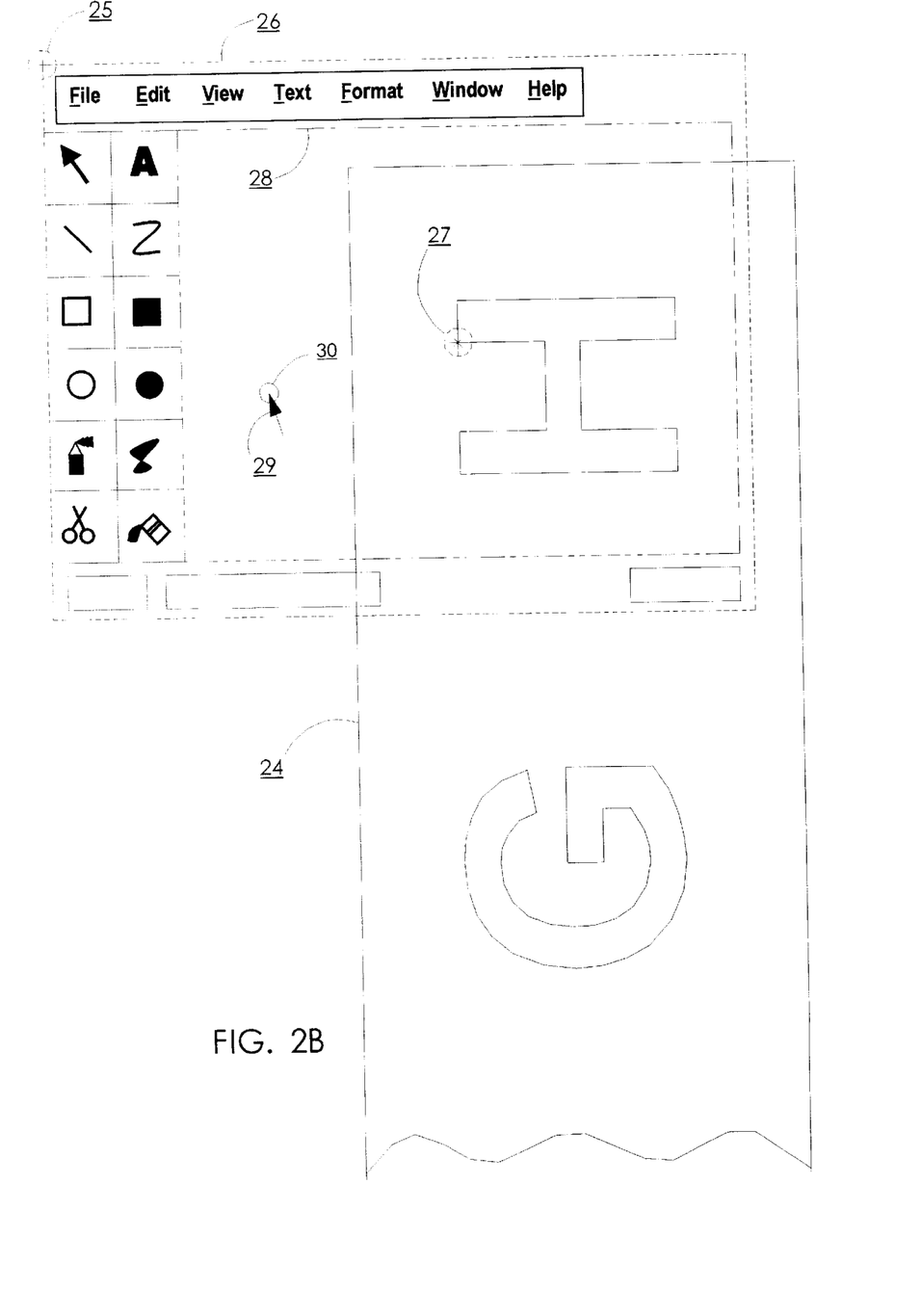

FIG. 2B illustrates a second functional stage at which the system has repainted viewport 28, viewport origin 27 has scrolled according to directional arrow 33, the beginning pointer location 30 now occupies the virtual screen location of ghost pointer location 31, and viewport 28 has zoomed in according to zoom-in factor 15 and an elapsed time interval.

Figure 3:
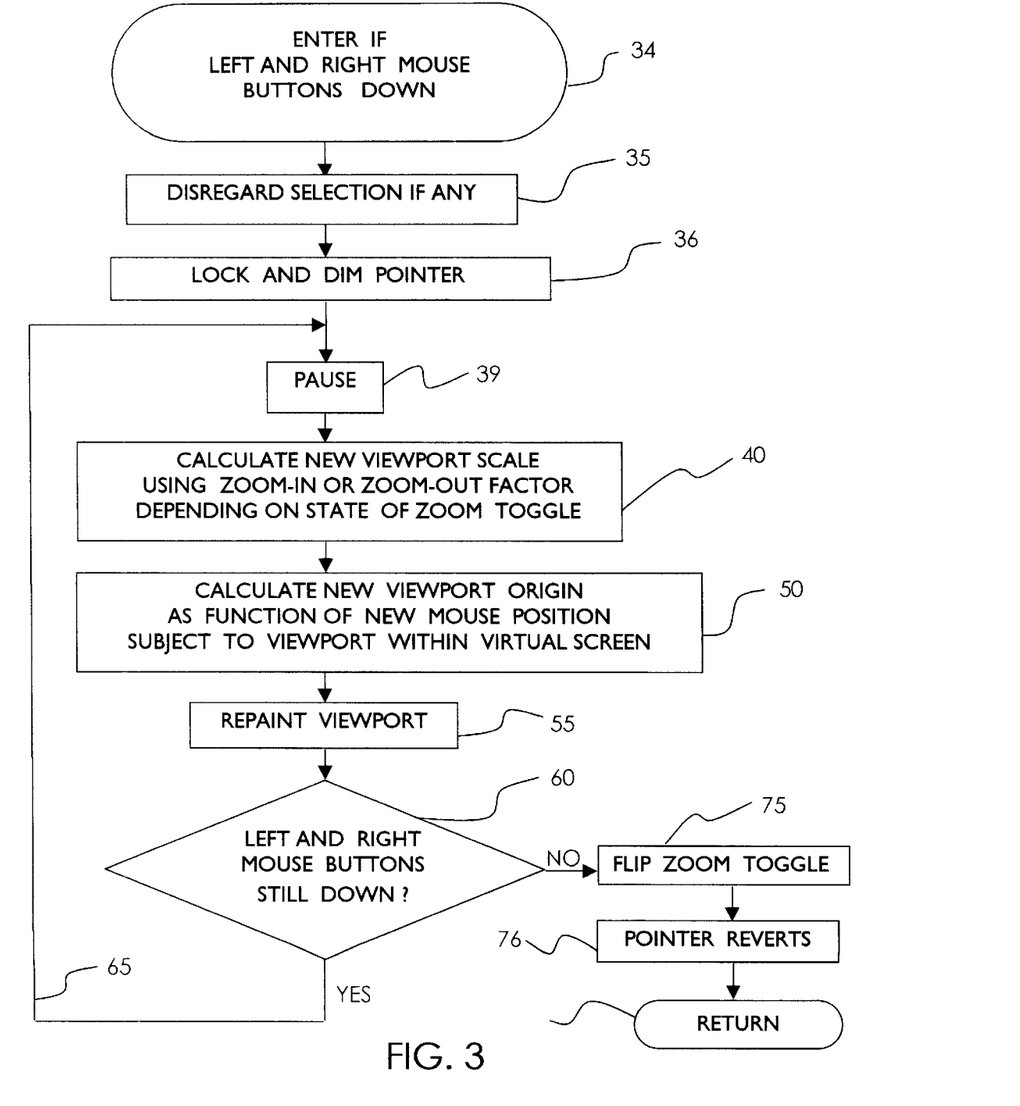
FIG. 3 is a high level flowchart summarizing the logic utilized by the data processing system.

Now referring to the summary flowchart of FIG. 3, a step 34 is the user input which activates the ensuing logic in CPU 16. In the preferred embodiment this input is the simultaneous depression of both the left button 20 and right button 21 of mouse 19. A step 35 acts to disregard any pointer selection of user data elements resulting from having pressed mouse buttons 20 or 21. In a step 36 pointer icon 29 dims and locks to its current location with respect to viewport origin 27, so it is functionally separated from mouse 19. In a step 39 the system pauses, as will be further described below. A step 40 then determines, according to the state of an alternating software zoom toggle, whether viewport 28 will zoom out by zoom-out factor 14 or zoom in by zoom-in factor 15. In a step 50 an alternative mouse 19 functionality is activated so that mouse 19 acts to move viewport 28 with respect to virtual screen 23. For example, mouse 19 movement to the right causes new portions of virtual screen 23 to appear adjacent to the right boundary of viewport 28 while corresponding portions disappear into the left boundary. In a step 55 the system repaints viewport 28. A step 60 is a juncture at which, if the depression of both mouse buttons 20 and 21 continues, then an iteration loop 65 is taken to repeat the above from before the step 39 pause. If said depression of mouse buttons does not continue, then, in a step 75, said software zoom toggle flips to its alternate state. In a step 76 pointer icon 29 reverts to its prior illumination and reconnects to mouse 19. In a step 77 the prior control of CPU 16 resumes.

Figure 4A:
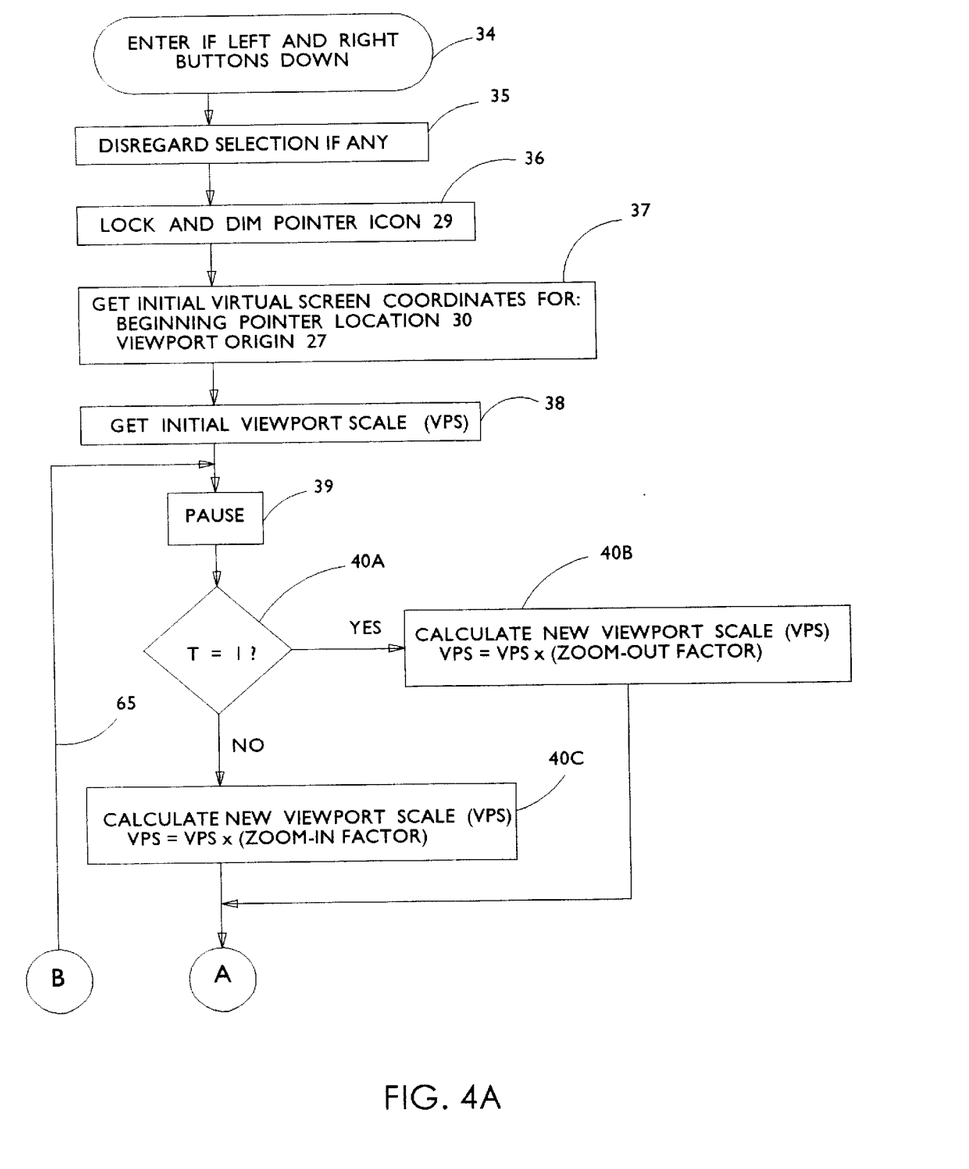
FIG. 4 is a flowchart more particularly illustrating the logic utilized by the data processing system.

Now referring to FIG. 4A, the steps 40A, 40B, and 40C relate to Step 40 of FIG. 3 and steps 34, 35, and 36 are as described above. In a step 37 the system records initial values for the virtual screen 23 coordinates of both beginning pointer location 30 and viewport origin 27. In a step 38 the system records an initial value for the current viewport scale, here designated "VPS" of graphic user data 12 displayed in viewport 28. If graphic user data 12 is stored in memory 11 as a bitmap, then VPS is a fraction equal to the pixels per display inch in viewport 28 divided by the "base scale" pixels per inch in virtual screen 23. If the user data is stored as features defined in a geometric space, then VPS is a fraction equal to the geometric dimensional units per display inch in viewport 28 divided by the "base scale" geometric dimensional units per inch in virtual screen 23.

Further referring to FIG. 4A, step 39 noted above designates a pause which controls the frequency of the iteration loop 65 noted above. In the preferred embodiment the duration of this pause is $1/28^{th}$ of a second to produce visually smooth scrolling and zooming movement of graphic user data 12 in viewport 28. However the processing and display refresh speed of the data processing system may require the pause to be longer.

In a step 40A the system examines the value of the software toggle, here designated "T", which may be either zero, indicating zoom in, or one, indicating zoom out. If T is equal to one then a step 40B calculates a new VPS value by multiplying the current VPS value by zoom-out factor 14. In the preferred embodiment the system zooms out so that so that after one second the new VPS is 0.5 times the prior VPS. Accordingly, at this zoom out rate and at a step 39 pause of $1/28^{th}$ of a second the zoom-out factor 14 is 0.5 E($1/28$) or approximately 0.9755. Similarly in a step 40C if T is not equal to one the system calculates a new VPS by multiplying the current VPS value by zoom-in factor 15. In the preferred embodiment the systems zooms in so that that after one second the new VPS is 1.75 times the prior VPS. Accordingly, at this zoom in rate and at a step 39 pause of $1/28^{th}$ of a second the zoom-in factor 15 is 1.75 E($1/28$) or approximately 1.0202. Both zoom-out factor 14 and zoom-in factor 15 are subject to user modification in the known manner, for example high, medium, low, or by slider.

Figure 4B:
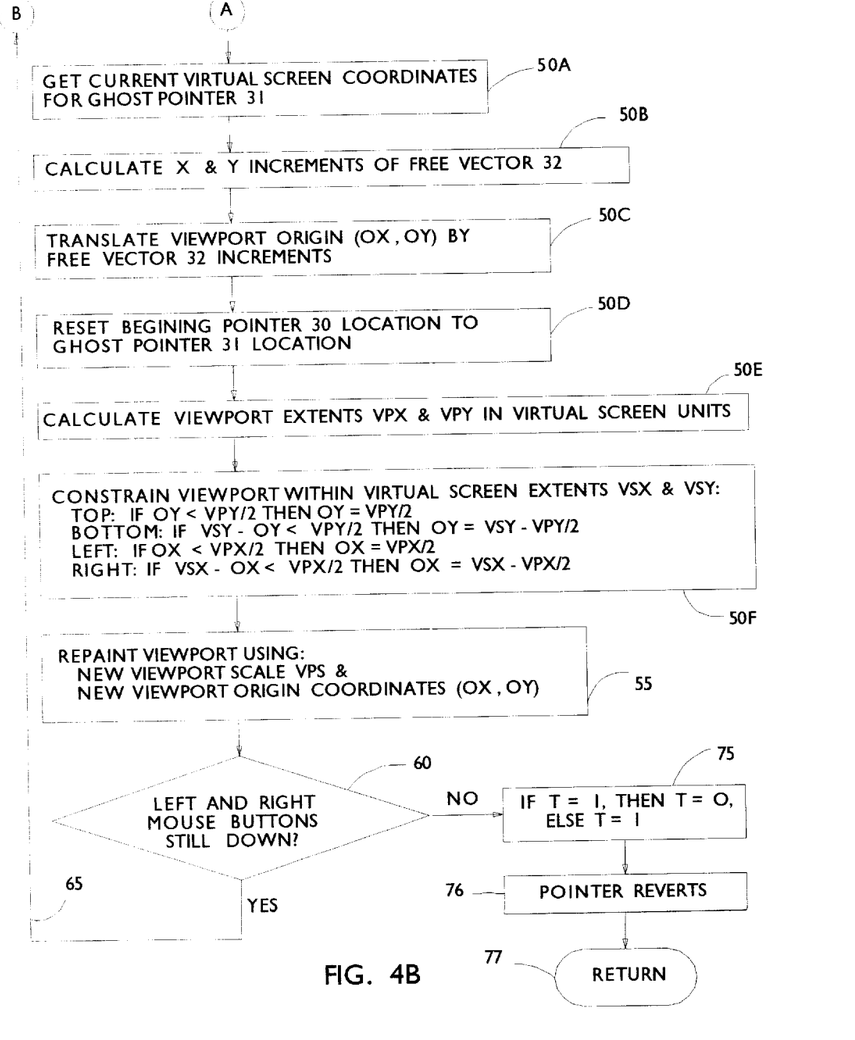

In FIG. 4B, node A designates continuation from FIG. 4A, after which the steps 50A–50F relate to step 50 of FIG. 3. At a step 50A the system records the current virtual screen coordinates of ghost pointer location 31, the user having dragged the mouse along the path represented by vector 32. Proceeding to a step 50B, the system calculates the virtual screen x and y increments of vector 32. A step 50C then increments the virtual screen coordinates of viewport origin 27, here designated "(OX, OY)", by said x and y increments of vector 32. It should be noted that while mouse 19 dictates the viewport coordinate unit length of vector 32 at the current viewport scale according to pointer options 13, the system records the length of vector 32 in virtual screen coordinate units. In this way, for a given mouse 19 displacement, as VPS increases the resulting viewport origin translation decreases. By this means the system provides the variable resolution scroll capability which is an object of the invention, helping the user efficiently home in on his or her target. A step 50D, in anticipation of the next iteration loop 65, then sets beginning pointer location 30 equal to ghost pointer location 31.

Further referring to FIG. 4B, a step 50E records the x and y extents of viewport 28 in virtual screen coordinate units, here designated "VPX" and "VPY" respectively, given the new viewport scale VPS calculated in step 40B or 40C. In a step 5OF the system constrains viewport origin 27 coordinates to keep viewport 28 within virtual screen 23. The x and y extents of virtual screen 23 are here designated "VSX" and "VSY" respectively. The formulae used to so constrain (OX, OY) at the respective top, bottom, left, and right borders of virtual screen 23 are:

Top: IF $OY<VPY/2$ THEN $OY=VPY/2$

Bottom: IF $VSY-OY<VPY/2$ THEN $OY=VSY-VPY/2$

Left: IF $OX<VPX/2$ THEN $OX=VPX/2$

Right: IF $VSX-OX<VPX/2$ THEN $OX=VSX-VPX/2$.

Step 55 noted above repaints viewport 28 using the newly updated viewport scale VPS and setting the viewport origin 27 at the newly calculated and constrained virtual screen coordinates (OX, OY). Step 60 is as described above.

In step 75 noted above the "FLIP ZOOM TOGGLE" instruction of FIG. 3 is expressed as: "IF T=1, THEN T=O, ELSE T=1". In step 76 pointer icon 29 reverts as noted above. Because pointer icon 29 was locked at its original location with respect to viewport origin 27 it scrolls with viewport 23, appearing to the user to remain stationary in the viewport frame during successive passes through iteration loop 65. Because beginning pointer location 30 was reset at step 50D to ghost pointer location 31 at the end of vector 32, when pointer icon 29 reverts it is coincident with the most recent beginning pointer location 30. Step 77 and iteration loop 65 are as described above.

CONCLUSION

The user operates the invention simply by depressing and holding the right and left mouse buttons simultaneously, while also moving the mouse if scrolling is desired. To reverse zoom direction the user releases and re-depresses one or both of the buttons. To continue zooming in a same direction the user re-depresses one or both of the buttons twice. Long range scrolling is efficiently performed by zooming out while scrolling in a general direction and then clicking to home in on the target, providing the user a smooth flight-like aesthetic. During operation the pointer is left dimmed as a marker to aid in visually locating it later.

The invention provides the user a free and efficient means to navigate the work area with no intruding graphical devices or requirement to perform multi-step procedures. Its principle value is that the user can operate it on a subliminal level thus minimizing visual and mental interruption of his or her work It should be noted that while prior improvements in user interface art involved invention of intuitive methods to perform certain tasks, further advancements towards the same objective will provide subliminal means which allow the user to better focus on the job at hand. Where in the prior art the mouse was a tool used to point to another tool, in the present invention the mouse is a single tool whose use on a cognitive level can follow the user's intentions with less effort.

Alternative Embodiments

While the above description of the invention illustrates its preferred embodiment numerous alternative methods and structures falling within the scope of the invention can be developed by those skilled in the art. Such alternative methods and structures include:

- Scroll/zoom following user input rather than during said user input, switching zoom direction at subsequent said input, revert at other user input, e.g. left mouse button.
- Alternative means to change zoom direction such as other mouse button or depression of a designated keyboard key or keys;
- Alternative means to indicate directional movement in place of a mouse such as a touch pad, keyboard arrow keys, or a joystick;
- Pointer icon turned off entirely with alternative icon such as a camera cross-hair paced in the viewport center;
- Pointer icon left connected to mouse and allowed to flicker between points 30 and 31 described above;
- Zoom-in and zoom-out factors not constant, for example zoom-in decelerates and zoom-out accelerates, or zoom controlled by mouse wheel;
- Selectively modify pointer speed option for faster scrolling during zoom out;
- Define viewport origin elsewhere, such as device origin 25;
- Provide scrolling without variable resolution feature described above;
- Viewport and virtual screen data not in same memory location.

I claim:

1. A method for combining zoom and scroll functions on a data processing system, said data processing system including a central processing unit, an elapsed time measurement means, a pointing device, a button set, a memory containing a means to store graphic user data, a zoom in factor designating increase in scale per unit of time further contained in said memory, a zoom out factor designating decrease in scale per unit of time further contained in said memory, a zoom toggle further contained in said memory designating either a zoom in state or a zoom out state, a display device, and a viewport contained in said display device displaying a portion of said user data, the method forming a programmed display function and comprising the steps of:

determining if said button set is actuated;

determine state of said zoom toggle;

if said zoom toggle is in said zoom in state, calculate change of scale of said viewport using said zoom in factor and said measurement of elapsed time during actuation of said button set;

if said zoom toggle is in said zoom out state, calculate change of scale of said viewport using said zoom out factor and said measurement of elapsed time during actuation of said button set;

determine change of position of said pointing device during actuation of said button set;

calculate change of position of said viewport with respect to said graphic user data proportional to said change of position of said pointing device;

display said viewport using said viewport scale change and said viewport position change, and;

if said button set changes from being activated to being disactivated reverse the state of said zoom toggle.

* * * * *